US010806143B2

(12) United States Patent
Liu

(10) Patent No.: US 10,806,143 B2
(45) Date of Patent: Oct. 20, 2020

(54) HERBICIDAL COMPOSITION IN GRANULAR FORM

(75) Inventor: Hong Liu, Pennington, NJ (US)

(73) Assignee: FMC Corporation, Philadelphia, PA (US)

(*) Notice: Subject to any disclaimer, the term of this patent is extended or adjusted under 35 U.S.C. 154(b) by 115 days.

(21) Appl. No.: 13/497,184

(22) PCT Filed: Oct. 11, 2010

(86) PCT No.: PCT/US2010/052163
§ 371 (c)(1),
(2), (4) Date: Mar. 20, 2012

(87) PCT Pub. No.: WO2011/046867
PCT Pub. Date: Apr. 21, 2011

(65) Prior Publication Data
US 2012/0190547 A1    Jul. 26, 2012

Related U.S. Application Data

(60) Provisional application No. 61/250,997, filed on Oct. 13, 2009.

(51) Int. Cl.
| | | |
|---|---|---|
| *A01N 43/653* | (2006.01) | |
| *A01N 47/36* | (2006.01) | |
| *A01N 25/14* | (2006.01) | |
| *A01N 25/30* | (2006.01) | |

(52) U.S. Cl.
CPC ........... *A01N 43/653* (2013.01); *A01N 47/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,443,764 | A * | 8/1995 | Lloyd et al. ................ | 264/15 |
| 6,869,914 | B2 | 3/2005 | Bratz et al. | |
| 2003/0148887 | A1* | 8/2003 | Bratz et al. ................ | 504/197 |
| 2005/0159316 | A1* | 7/2005 | Chen et al. ................ | 504/367 |
| 2006/0122060 | A1* | 6/2006 | Keenan et al. ............. | 504/211 |
| 2007/0066487 | A1* | 3/2007 | Schnabel et al. .......... | 504/211 |
| 2009/0131257 | A1 | 5/2009 | Beestman et al. | |
| 2009/0197765 | A1* | 8/2009 | Gaytan et al. ............. | 504/130 |
| 2009/0247597 | A1* | 10/2009 | Vermeer et al. ........... | 514/383 |

FOREIGN PATENT DOCUMENTS

| | | |
|---|---|---|
| CN | 1124074 C | 10/2003 |
| CN | 100423643 C | 10/2008 |
| EP | 0666708 B1 | 10/2000 |
| JP | 09183704 A | 7/1997 |
| JP | 2000159603 A | 6/2000 |
| WO | WO 2008037377 A2 * | 4/2008 |

OTHER PUBLICATIONS

EPA Pesticide Fact Sheet—Carfentrazone-ethyl, United States Environmental Protection Agency (1998), pp. 1-11.*
Commission Working Document-Sulfosulfuron, European Commission (2002), pp. 1-19.*

* cited by examiner

*Primary Examiner* — John Pak
(74) *Attorney, Agent, or Firm* — FMC Corporation

(57) ABSTRACT

The present invention provides light weight, water dispersible, granular compositions containing a first herbicide and a second herbicide in which the first herbicide and the second herbicide have different physical characteristics. In particular, the present invention relates to granular herbicidal compositions comprising a low melting point herbicide, carfentrazone-ethyl, and a high melting point herbicide, sulfosulfuron, having excellent dispersibility in water and chemical and physical stability.

12 Claims, No Drawings

HERBICIDAL COMPOSITION IN GRANULAR FORM

This application claims the benefit of U.S. Provisional Application No. 61/250,997 filed Oct. 13, 2009.

FIELD OF THE INVENTION

The present invention relates to granular herbicidal compositions having good dispersibility in water and chemical and physical stability. In particular, the present invention relates to water dispersible granular herbicidal compositions.

BACKGROUND OF THE INVENTION

To enable the efficient elimination or controlling of unwanted plants, it is desirable to use effective chemical formulations of herbicides to evenly disperse the active ingredients. Compositions containing two or more herbicides are desirable in agricultural, specialty applications and related endeavors due to broadening the spectrum or range of unwanted plant species killed or controlled.

Due to the desirability of having a composition with the above-mentioned properties, it is useful to use combinations of herbicides to obtain enhanced control of numerous weeds with a single application. One method of preparing such a composition is referred to as "tank mixing" in which the ingredients in their commercially available form are mixed together by the user in a quantity of water. Tank mixes require the end user to purchase two or more commercial formulations, store them, calculate the correct amount of each active ingredient, measure those amounts into the mix and when empty, properly dispose of a number of containers.

Combining two active ingredients into one formulation is beneficial but is frequently more complex due to widely different physical properties, for example, widely differing melting points and solubility of the active ingredients. In addition, chemical and physical stability are often problems when attempting to combine two active ingredients into one formulation.

Emulsifiable concentrates and similar liquid formulations are common formulations for water in-soluble active ingredients, using volatile organic or aromatic solvents to solubilize the actives prior to emulsification, in an aqueous phase. The use of volatile organic and aromatic solvents is discouraged by many environmental agencies because of toxicity, irritation, flammability and bad odor problems. Flowable formulations are suspensions and are highly viscous and difficult to remove from the containers, creating special container rinsing and container disposal issues. Although such liquid formulations are easy to measure and use, the cost of shipping and handling heavy liquids can be expensive.

Water dispersible granule and wettable granule formulations are difficult preparations in that one has to overcome problems such as dustiness, granules that are too soft and agglomerate and granules that are too hard and do not disperse well enough, often times requiring long tank mix times. Even more difficult is the preparation of a granule formulation containing two active ingredients that have very different physical characteristics, for example, a water dispersible granule formulation, which contains both liquid and solid active components, that disperses well in water.

It would be most beneficial to provide a chemically stable, light weight solid composition comprising two herbicides which have different physical characteristics and provides quick and even dispersion when mixed into water for application.

SUMMARY OF THE INVENTION

The present invention provides light weight, water dispersible, granular compositions containing a first herbicide and a second herbicide in which the first herbicide and the second herbicide have different physical characteristics. In particular, the present invention relates to granular herbicidal compositions comprising a low melting point herbicide, carfentrazone-ethyl, and a high melting point herbicide, sulfosulfuron, having excellent dispersibility in water and chemical and physical stability.

DETAILED DESCRIPTION OF THE INVENTION

The present invention relates to light weight granular herbicidal compositions containing a first herbicide and a second herbicide in which the first herbicide and the second herbicide have different physical characteristics. The composition provides quick and even dispersion in water and is chemically and physically stable. In particular, the present invention is directed to novel water dispersible granular herbicidal compositions comprising two water-insoluble herbicidal active ingredients which have different melting points comprising:

i) carfentrazone-ethyl, absorbed onto a carrier;
ii) sulfosulfuron;
iii) a dispersant component comprising:
   a lignosulfonate present in an amount of at least 6% by weight of all the components in the total composition,
   an alkyl naphthalene sulfonate formaldehyde condensate salt, and
   an alkyl naphthalene sulfonate;
iv) a wetting component;
v) a diluent component; and
vi) an acid.

The composition of the present invention may further comprise a preservative or biocide.

Water-insoluble means the technical active ingredient has a solubility of about 2 grams or less per liter of water at 20° C.

The first herbicide is carfentrazone-ethyl, the common name for ethyl 2-chloro-3-[2-chloro-5-(4-difluoromethyl-3-methyl-5-oxo-4,5-dihydro-[1,2,4] triazol-1-yl)-4-fluorophenyl]propionate, and is a viscous oil at ambient temperature, has a melting point of minus 22.1° C. and a water solubility of 22 milligrams per liter at 20° C.

In the process of the present invention, carfentrazone-ethyl is absorbed onto an appropriate carrier (% loading) in a range of from 50% to 62% loading by weight of the carfentrazone-ethyl and the carrier, preferably 50% to 56% loading. The carrier must be able to absorb an adequate amount of carfentrazone-ethyl in order to provide a herbicidally effective amount in the final formulation. The loaded carrier should be free flowing and yield excellent dispersion properties in the final formulation. Appropriate carriers include, for example, clays, synthetic amorphous silica gels, hydrophilic silicas and precipitated silicas. In a preferred embodiment, carfentrazone-ethyl is absorbed onto precipitated silica in a loading by weight of between 52% and 56%. The preferred precipitated silica is Hi-Sil® ABS from PPG Industries. The inventor has found that Hi-Sil® ABS precipitated silica cannot absorb a % loading of greater than 62% by weight of carfentrazone-ethyl and still be free flowing. By "free flowing" it is meant that the loaded carrier is not sticky, is free of clumps, and may be easily poured. When employing carfentrazone-ethyl loaded onto precipitated silica, the loaded carrier can be present in a range of from about 9% to about 55% by weight of all the components in the total composition. This range equates to a carfentrazone-ethyl concentration of about 5% to about 30% by weight of all the components in the total composition. In a more preferred embodiment, the carfentrazone-ethyl loaded carrier can be present in a range of from 35% to 40% by weight of all the components in the total composition. This preferred range equates to a carfentrazone-ethyl concentration of from about 18% to about 22% by weight of all the components in the total composition.

The second herbicide is sulfosulfuron, the common name for N-[[(4,6-dimethoxy-2-pyrimidinyl)amino]carbonyl]-2-(ethylsulfonyl)imidazo[1,2-α]pyridine-3-sulfonamide, which has a melting point of 201.5° C. and a water solubility of 1.6 grams per liter at 20° C. In the final formulation it is preferred that sulfosulfuron be present in a range from about 1% to about 70% by weight of all the components in the total composition. A most preferred range is from 25% to 30% by weight of all the components in the total composition.

The weight ratio of carfentrazone-ethyl to sulfosulfuron in the total composition is preferably about 4:5.

The dispersant component of the present composition comprises a lignosulfonate, an alkyl naphthalene sulfonate formaldehyde condensate salt, and an alkyl naphthalene sulfonate. Preferably, the dispersant can be present in a range of from about 15% to 20%, more preferably in a range of from about 17% to 18% by weight of all the components in the total composition.

The lignosulfonate is preferably a kraft lignosulfonate. Examples of commercially available kraft lignosulfonates include Polyfon® O, Polyfon® T, Polyfon® H, Kraftsperse® EDF, Reax® 88B and Reax® 907 all available from MeadWestVaco Inc. The preferred kraft lignosulfonate is Polyfon® O. The lignosulfonate is present in an amount of at least 6% by weight of all the components in the total composition, preferably in a range from about 6% to about 12%, and more preferably in a range from 6% to 8% by weight of all the components in the total composition.

The alkyl naphthalene sulfonate formaldehyde condensate salt (NSF salt) is preferably the sodium salt, for example, Tersperse® 2425 available from Huntsman Corporation. The NSF salt can be present in a range of from about 2% to about 6%, preferably in a range of from 2% to 3% by weight of all the components in the total composition.

Examples of useful alkyl naphthalene sulfonates (ANS) are Agnique ANS 3DNPW and Agnique ANS 3DNP-U, both available from Cognis Corporation. The preferred ANS is Agnique ANS 3DNP-U. The ANS can be present in a range from about 6% to about 12%, preferably in a range from 6% to 8% by weight of all the components in the total composition.

The wetting component comprises a wetting agent selected from the group consisting of a sodium alkyl benzene sulfate and sodium oleoyl N-methyl taurates or a mixture thereof. The wetting component should be able to provide quick and complete wetting of the composition when applied to the surface of water in order for the dispersant component of the composition to evenly distribute the active ingredients to the target areas. If wetting is too slow the composition can agglomerate causing large portions of the composition to sink, providing uneven distribution of the active ingredients. Wetting agents such as sodium alkyl benzene sulfates and sodium oleoyl N-methyl taurates are preferred for the present compositions. Examples of preferred wetting agents are Stepwet® DF90 (a sodium alkyl benzene sulfonate) available from Stepan Company and Geropon® T-77 a sodium oleoyl N-methyl taurate) available from Rhodia Inc. The wetting agent can be present in a range from about 0.5% to about 3%, preferably in a range from 1% to 2% by weight of all of the components in the total composition.

The diluent component of the present invention comprises a mixture of ammonium sulfate and continental clay, in a ratio of from 2:1 to 1:2, preferably in a 1:1 ratio. The diluent component is present as a quantity sufficient component in the composition and is present as determined by the amounts of other components in the total composition. For example, when the components other than the diluent component add up to 82%, then the diluent component will be present in an amount of 18%, to make the total 100%, and when the components other than the diluent component add up to 76%, the diluent component will be present in an amount of 24% by weight of all the components in the composition, thus making the total 100%. It is preferred that the diluent component be present in an amount from 18% to 20% by weight of all the components in the total composition. The inventor has found that the use of ammonium sulfate in the present invention significantly improved the dispersion quality of the composition in water. The inventor has also found that the use of continental clay improved the formulation process by preventing agglomeration of the carfentrazone-ethyl loaded silica during the blending and kneading process.

The acid component serves to adjust the pH of the composition and to aid in reducing ammonia odor due to the ammonium sulfate. For this purpose, citric acid is preferred and is present in an amount from 0.1% by weight to 0.2% by weight of all the components in the total composition.

One embodiment of the present invention is a method for the control of unwanted plants comprising applying a pesticidally effective amount of the composition of the present invention to an area where such control is desired.

A preferred embodiment of the present invention is a granular herbicidal composition comprising:
i) carfentrazone-ethyl, absorbed onto precipitated silica, in which the carfentrazone-ethyl is present in an amount of from 18% to 22% by weight of all the components in the total composition;
ii) sulfosulfuron present in an amount of from 25% to 30% by weight of all the components in the total composition;
iii) a dispersant component comprising:
a kraft lignosulfonate present in an amount of at least 6% by weight of all the components in the total composition,
an alkyl naphthalene sulfonate formaldehyde condensate salt present in an amount of from 2% to 3% by weight of all the components in the total composition, and
an alkyl naphthalene sulfonate present in an amount of from 6% to 8% by weight of all the components in the total composition;
iv) a wetting agent selected from the group consisting of sodium alkyl benzene sulfonate and sodium oleoyl N-methyl taurate present in an amount of from 1% to 2% by weight of all the components in the total composition;

v) ammonium sulfate and continental clay present in a ratio of 1:1 and in an amount of from 18% to 24% by weight of all the components in the total composition; and vi) citric acid present in an amount of from 0.1% to 0.2% by weight of all the components in the total composition.

The preferred process for preparing a water dispersible granular herbicidal composition of the present invention comprises:
a) absorbing carfentrazone ethyl onto precipitated silica;
b) forming a mixture of sulfosulfuron, a dispersant component, a wetting component, a diluent component, an acid component and optionally, a preservative;
c) combining the mixture from step a) with that of step b);
d) kneading the mixture from step c) with sufficient water to form a smooth material with dough-like consistency;
e) extruding the kneaded mixture from step d); and
f) drying the extruded mixture from step e).

The process further comprises milling the mixture of step b) prior to combining. To form useful and stable granules it is preferred that the extruded mixture from step e) be dried to a moisture content of less than 1%. This may be done by evaporation under reduced pressure, heating in an oven or other conventional drying methods.

As used in this specification and, unless otherwise indicated, the term "herbicide" refers to a molecule or combination of molecules that inhibits or otherwise kills unwanted plants, such as, but not limited to, deleterious or annoying weeds, broadleaf plants, grasses and sedges and can be used for crop protection, edifice protection or turf protection. The term "herbicidally effective amount" means an amount necessary to produce an observable herbicidal effect on unwanted plant growth, including the effects of necrosis, death, growth inhibition, reproduction inhibition, inhibition of proliferation, and removal, destruction, or otherwise diminishing the occurrence and activity of unwanted plants.

The terms "ambient temperature" and "room temperature" as utilized herein shall generally mean any suitable temperature found in a laboratory or other working quarter, and is generally neither below about 15° C. nor above about 30° C.

As used herein, "% by weight of all components in the total composition" includes the wt % of all liquid and solid components in the composition unless otherwise defined.

The process and compositions of the present invention are further illustrated by the examples below. The examples serve only to illustrate the invention and should not be interpreted as limiting since further modifications of the disclosed invention will be apparent to those skilled in the art. All such modifications are deemed to be within the scope of the invention as defined in the claims.

Example 1

Preparation of a Water Dispersible Granular Composition of Carfentrazone-ethyl and Sulfosulfuron Sample 1 was prepared as follows:

Step A

A Processall 140 liter plow blender (Processall Inc) was heated to a temperature of about 100° C., then charged with 5.5769 kilograms of pre-heated (100° C.) precipitated silica (HilSil® ABS). Technical carfentrazone-ethyl (8.0308 kilograms, 91.5% purity) was heated to 80° C. and charged to a pre-heated pressure spray canister. The plow blender was started and the hot carfentrazone-ethyl was sprayed onto the tumbling silica. Blending was continued for about 15 minutes after the addition was completed. The resultant coated silica was transferred to a plastic storage bag and allowed to cool to room temperature, and then sealed, to yield 12.5 kilograms of carfentrazone-ethyl coated silica (54.5% loading).

Step B

A mixture of 12.5 grams of technical grade sulfosulfuron (98.55% purity), 4.0 grams of a kraft lignosulfonate (Polyfon® O), 3.0 grams of an alkyl naphthalene sulfonate (Agnique ANS 3DNP-U), 1.0 gram of an alkyl naphthalene sulfonate formaldehyde condensate salt (Tersperse® 2425), 1.0 gram of a sodium alkyl benzene sulfonate (Stepwet® DF-90), 4.72 grams of ammonium sulfate, 4.73 grams of continental clay and 0.05 gram of citric acid was blended in a Kitchen Aid blender for 5 minutes. This mixture was milled in a hammer mill until a particle size of 12 microns or less was obtained (D90). The milled mixture was added to a Kitchen Aid blender affixed with a kneading hook and 19.0 grams of the carfentrazone-ethyl coated silica from Step A was added. This mixture was mixed for about 5 minutes. Water (about 10 grams) was added slowly while kneading in the blender until the mixture had a smooth dough type consistency. The wet dough material was extruded using a dome extruder with a 0.8 mm die. The extruded material was collected in trays and dried in a 55° C. oven for 30 minutes. The resultant granular composition was packaged in glass jars which were sealed for storage.

Additional Samples of water dispersible granular compositions of carfentrazone-ethyl and sulfosulfuron were prepared in a manner similar to Sample 1 and are listed in Table 1 below as Samples 2-11. Comparative Samples A and B were similarly prepared and are also listed in Table 1. Comparative Sample A was prepared using 4% by weight of the kraft lignosulfonate and Comparative Sample B was prepared using 0% of the kraft lignosulfonate.

The Samples were tested for suspensibility (CIPAC Handbook, "MT168 Suspensibility of Water Dispersible Granules"), dispersibility, particle size, wet sieve retention (CIPAC Handbook, "MT 185 Wet Sieve Test), pH and for chemical stability. The Samples were tested for initial results and after storage at 54° C. for two weeks. Some of the compositions underwent stability testing after storage at room temperature for up to 18 months. This data is listed in Table 2 below.

Acceptable result values for suspensibility are 70% or greater.

The dispersibility test was performed by adding 1 gram of the test composition to 50 mL of water with 342 ppm hardness at 2° C. in a 50 mL Nessler tube. The Nessler tube was sealed with a rubber stopper and the contents mixed by inverting the tube. The number of inversions needed to completely disperse the composition was recorded. Acceptable result values are less than 25 inversions with no flocculation, sedimentation or other visible physical inconsistencies such as phase separation and the like.

Particle size was measured using a particle size distribution analyzer (Horiba Particle Scattering Particle Size Distribution Analyzer LA-910). Acceptable result values for particle size are 30 microns at D90 or less.

Acceptable result values for wet sieve retention on a 325 mesh sieve are less than 2% retained.

The pH of the Samples was measured by preparing a 1% by weight aqueous solution in deionized water. Acceptable pH values are ±5% of the original value after storage at room temperature or at 54° C.

Chemical stability was determined by comparing the initial active ingredient assay (HPLC analysis) to the active ingredient assay for stability samples. Acceptable stability values are those that are within ±3% of the initial assay.

TABLE 1

Water Dispersible Granular Compositions of Carfentrazone-ethyl and Sulfosulfuron % By Weight Of Composition Ingredients *

| Sample number | Carfentrazone | Sulfosulfuron | Kraft ligno | NSF salt | ANS | DF-90 | T-77 | Amm sulfate | Cont clay | Citric acid |
|---|---|---|---|---|---|---|---|---|---|---|
| 1  | 38    | 25    | 8 | 2    | 6 | 2 | 0    | 9.45  | 9.45  | 0.1  |
| 2  | 38    | 25    | 8 | 2    | 6 | 0 | 2    | 9.45  | 9.45  | 0.1  |
| 3  | 37.03 | 25    | 8 | 2    | 6 | 0 | 2    | 9.93  | 9.94  | 0.1  |
| 4  | 38    | 25    | 8 | 2    | 6 | 2 | 0    | 9.45  | 9.45  | 0.1  |
| 5  | 38    | 25    | 8 | 2    | 6 | 2 | 0    | 9.45  | 9.45  | 0.1  |
| 6  | 37.8  | 25.75 | 8 | 2    | 6 | 0 | 2    | 9.17  | 9.18  | 0.1  |
| 7  | 38    | 25    | 6 | 2    | 6 | 2 | 0    | 10.45 | 10.45 | 0.1  |
| 8  | 36.7  | 25    | 6 | 2    | 6 | 2 | 0    | 11.1  | 11.1  | 0.1  |
| 9  | 37.03 | 25    | 6 | 2    | 6 | 2 | 0    | 10.93 | 10.94 | 0.1  |
| 10 | 38    | 25    | 8 | 2    | 6 | 1 | 0    | 9.95  | 9.95  | 0.1  |
| 11 | 38    | 25    | 8 | 2    | 6 | 1 | 0    | 9.95  | 9.95  | 0.1  |
| A  | 38    | 25    | 4 | 2    | 6 | 2 | 0    | 11.45 | 11.45 | 0.1  |
| B  | 36.7  | 25.4  | 0 | 2.01 | 6 | 0 | 2.03 | 13.92 | 13.9  | 0.12 |

* Carfentrazone = carfentrazone-ethyl coated silica (54.5% loading)
* Kraft lingo = kraft lignosulfonate Polyfon® O
* NSF salt = alkyl naphthalene sulfonate formaldehyde condensate sodium salt Tersperse® 2425
* ANS = alkyl naphthalene sulfonate Agnique ANS 3DNP-U
* DF-90 = wetting agent Stepwet® DF-90
* T-77 = wetting agent Geropon® T-77
* Amm sulfate = Ammonium sulfate
* Cont clay = continental clay

TABLE 2

Physical and Chemical Stability of Water Dispersible Granular Compositions of Carfentrazone-ethyl and Sulfosulfuron

| | Sample Number | | | | | |
|---|---|---|---|---|---|---|
| | 1 | 2 | 3 | 4 | 5 | **6 |
| *Initial Test | | | | | | |
| Susp % | 92 | 98 | 94 | 93 | 97 | 93 |
| Disp | 9 | 10 | 9 | 10 | NT | 9 |
| Part size microns | 15.6 | 17.5 | 13.6 | 26.4 | 23.4 | 19.8 |
| Wet sieve % retained | 0.04 | 0.05 | 0.09 | 0.11 | 0.02 | 0.2 |
| pH | 5.32 | 5.13 | 5.35 | 6.18 | 6.39 | 5.3 |
| assay | NT | NT | NT | NT | NT | 21.0/25.8 |
| *2 Wk @ 54° C. | | | | | | |
| Susp % | 73 | 86 | 90 | 84 | 83 | 89 |
| Disp | 10 | 10 | 8 | 10 | 8 | 11 |
| Part size microns | 22.5 | 24.9 | 23.5 | 24.2 | 18.8 | 16.8 |
| Wet sieve % retained | 0.21 | 0.04 | 0.08 | 0.06 | 0.09 | 0.96 |
| pH | 5.47 | 5.33 | 5.52 | 6.11 | 6.18 | 5.48 |
| assay | NT | NT | NT | NT | NT | 20.1/26.0 |

| | Sample Number | | | | | |
|---|---|---|---|---|---|---|
| | 7 | 8 | 9 | 10 | 11 | A | B |
| *Initial Test | | | | | | | |
| Susp % | 97 | 94 | 93 | 93 | 92 | 90 | 54 |
| Disp | 7 | 11 | 9 | 7 | 11 | 12 with flocculation | 8 with flocculation |
| Part size microns | 15.7 | 13.8 | 13.6 | 14.6 | 16.3 | 155.0 | 188.8 |
| Wet sieve % retained | 0.11 | 0.41 | 0.03 | 0.06 | 0.19 | 0.24 | 11.9 |
| pH | 5.32 | 5.30 | 5.46 | 5.53 | 5.56 | NT | 4.4 |
| Assay | NT | NT | NT | NT | NT | NT | NT |
| *2 Wk @ 54° C. | | | | | | | |
| Susp | 83 | 88 | 86 | 92 | 93 | NT | NT |
| Disp | 9 | 14 | 7 | 7 | 8 | NT | NT |
| Part size | 21.8 | 19.1 | 19.1 | 16.9 | 18.6 | NT | NT |
| Wet sieve % retained | 0.13 | 0.0 | 0.29 | 0.07 | 0.09 | NT | NT |
| pH | 5.41 | 5.31 | 5.58 | 5.54 | 5.78 | NT | NT |
| assay | NT | NT | NT | NT | NT | NT | NT |

*Susp % = % suspensibility as determined by CIPAC Handbook Test MT168
Disp = Dispersibility
Part size microns = particle size in microns at D90
Assay = HPLC assay of carfentrazone ethyl/sulfosulfuron
NT = Not tested
**Samples of the composition of Sample 6 were maintained at room temperature and were tested for stability at 1, 3, 6, 12 and 18 months. All results were within the acceptable values as described above.

All of Samples 1-11, which are within the scope of the present invention, were within the acceptable values as described above. None of these Samples displayed flocculation or sedimentation when dispersed in water.

Comparative Sample A contained only 4% by weight of the kraft lignosulfonate and as a result exhibited a very large particle size and when dispersed in water caused flocculation. Comparative Sample B contained no kraft lignosulfonate and as a result exhibited very large particle size and when dispersed in water caused flocculation. Thus, it can be seen that Comparative Samples A and B produced unacceptable results and are outside of the current invention.

Example 2

Herbicidal Activity of Water Dispersible Granular Compositions of Carfentrazone-ethyl and Sulfosulfuron Water dispersible granular (WDG) composition as prepared in Sample 6 was tested for herbicidal activity in wheat fields located in Northern India. Wheat (variety PBW-343) was planted in test plots of 40 square meters, three replications for each test. The water dispersible granular composition (WDG Treatment) was dissolved in water and applied to the test plots 37 days after planting, at the rates indicated in Table 3 below. The percent control of *Phalaris minor, Chenopodium album, Rumex* spp., and *Medicago* spp. were recorded for each test at 45 days after treatment. The average percent control is summarized in Table 3 below.

TABLE 3

Percent Control of Weeds Using Water Dispersible Granular Compositions of Carfentrazone-ethyl and Sulfosulfuron

| Test Number | *WDG Treatment gm/Ha | **Surfactant Added mL/Ha | % Control | | | |
|---|---|---|---|---|---|---|
| | | | *Phalaris minor* | *Chenopodium album* | *Rumex* spp. | *Medicago* spp. |
| Test 1 | 100 | 0 | 50 | 90 | 93 | 60 |
| Test 2 | 100 | 625 | 87 | 97 | 95 | 68 |
| Test 3 | 100 | 750 | 90 | 97 | 95 | 70 |
| Test 4 | 100 | 875 | 92 | 98 | 94 | 70 |
| Carfentrazoneethyl 20% WDG | 20 grams AI/Ha | 0 | 20 | 100 | 94 | 60 |
| Sulfosulfuron 75% WDG | 25 grams AI/Ha | 1250 | 90 | 40 | 40 | 50 |
| Untreated Control | 0 | 0 | 0 | 0 | 0 | 0 |

*WDG treatment of 100 grams/Ha is equal to 20 grams AI/Ha of carfentrazone-ethyl and 25 grams AI/Hectar of sulsulfuron.
**Cationic surfactant added to tank mixture before spraying.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A water dispersible granular herbicidal composition consisting essentially of:
   i) a loaded carrier comprising carfentrazone-ethyl, absorbed onto the carrier;
   ii) sulfosulfuron;
   iii) a dispersant component comprising a kraft lignosulfonate present in an amount of from at least 6% by weight of all the components in the total composition, an alkyl naphthalene sulfonate formaldehyde condensate salt present in an amount of from 2% to 3% by weight of all the components in the total composition, and an alkyl naphthalene sulfonate present in an amount of from 6% to 8% by weight of all the components in the total composition;
   iv) a wetting component selected from the group consisting of a sodium alkyl benzene sulfate and a sodium oleoyl N-Methyl taurate or a mixture thereof, present in a range of from about 0.5% to about 3% by weight of all the components in the total composition;
   v) a diluent component comprising a mixture of ammonium sulfate and continental clay; and
   vi) an acid;
   wherein the granular herbicidal composition has a particle size distribution at D90 of 30 microns or less.

2. The granular composition of claim 1 wherein a preservative is included in the composition.

3. The composition of claim 1 wherein the carfentrazone ethyl is present in an amount from 5% to 30% by weight of all the components in the total composition and the sulfosulfuron is present in an amount from 7% to 45% by weight of all the components in the total composition.

4. The composition of claim 3 wherein the carfentrazone ethyl is present in an amount from 18% to 22% by weight of all the components in the total composition and the sulfosulfuron is present in an amount from 25% to 30% by weight of all the components in the total composition.

5. The water dispersible granular herbicidal composition of claim 1 wherein:
   i) the carrier is precipitated silica, wherein the carfentrazone ethyl is present in an amount from 18% to 22% by weight of all the components in the total composition;
   ii) the sulfosulfuron is present in an amount from 25% to 30% by weight of all the components in the total composition;
   iii) the dispersant component comprises the kraft lignosulfonate in an amount of from 6% to 12% by weight of all the components in the total composition, an alkyl naphthalene sulfonate formaldehyde condensate salt present in an amount of from 2% to 3% by weight of all the components in the total composition, and an alkyl naphthalene sulfonate present in an amount from 6% to 8% by weight of all the components in the total composition;
   iv) the wetting agent is sodium alkyl benzene sulfonate present in an amount from 1% to 2% by weight of all the components in the total composition;
   v) the ammonium sulfate and continental clay are present in a ratio of 1:1 and in an amount of from 18% to 24% by weight of all the components in the total composition; and
   vi) the acid is citric acid present in an amount of from 0.1% to 0.2% by weight of all the components in the total composition.

6. The composition of claim 1 wherein said composition has moisture content of less than 1 wt %.

7. A method for the control of unwanted plants comprising applying a herbicidally effective amount of the composition of claim 1 to an area where such control is desired.

8. The method of claim 7 wherein the unwanted plants are selected from the group consisting of *Phalaris minor, Chenopodium album, Rumex* spp. or *Medicago* spp.

9. The method of claim 7 wherein the area where such control is desired is a wheat field.

10. A process for preparing the water dispersible granular herbicidal composition of claim 1, the process comprising the steps of:
   a) absorbing carfentrazone-ethyl onto a carrier;
   b) forming a mixture of sulfosulfuron, a dispersant component comprising a kraft lignosulfonate, an alkyl napthalene sulfonate formaldehyde condensate salt and an alkyl napthalene sulfonate, a wetting component comprising sodium alkyl benzene sulfonate, a diluent component comprising a mixture of ammonium sulfate and continental clay, an acid component and optionally, a preservative;
   c) combining the mixture from step a) with that of step b);
   d) kneading the mixture from step c) with sufficient water to form a material with dough-like consistency;
   e) extruding the kneaded mixture from step d); and
   f) drying the extruded mixture from step e), separating particles having a particle size of 30 microns or less by size exclusion separation means and collecting said particles to obtain the granular herbicidal composition.

11. The process of claim 10, wherein the dispersant component is mixed with the other components to provide a kraft lignosulfonate present in an amount of from 6% to 12% by weight of all the components in the total composition, an alkyl naphthalene sulfonate formaldehyde condensate salt present in an amount of from 2% to 3% by weight of all the components in the total composition, and an alkyl naphthalene sulfonate present in an amount from 6% to 8% by weight of all the components in the total composition.

12. The process of claim 10 further comprising the step of: milling the mixture of step b) prior to combining the mixture in step c).

* * * * *